Patented May 3, 1938

2,115,797

UNITED STATES PATENT OFFICE 2,115,797

WATERPROOF COMPOUND

Maurice Henri Belloc, Paris, France, assignor to Societe Nobel Francaise, Paris, France, a joint-stock company No Drawing. Application March 2, 1936, Serial No. 66,697. In France March 7, 1935

4 Claims. (Cl. 134—13)

The present invention has for its object the preparation of a waterproof compound consisting of polymerized vinyl derivatives having the chemical composition of acetals.

It is well known to waterproof paper, fabrics, regenerated cellulose and similar products by means of varied solutions containing in general waxes or paraffin. Said compounds are constituted generally by nitrocellulose, a wax or paraffin and a suitable solvent mixture which can also contain an oil. Finally, compounds may be used containing acetate or other cellulose esters or ethers.

Generally, waterproofing coatings of this kind contain a cellulose ester or ether associated with a wax, a paraffin or an oil. Said coatings have a number of drawbacks.

1. They are not very adherent, particularly to highly polished supports such as regenerated cellulose; in particular they are easily unstuck by immersion in water.

2. They are insufficiently flexible, this drawback being particularly important for waterproofing fabrics.

3. The coatings which contain nitrocellulose are very inflammable and, owing to this fact, their application is rather delicate.

4. It is rather difficult, particularly if nitrocellulose or cellulose acetate is used as a support for the waterproofing bodies, to find a compound of solvents which dissolve sufficiently well, on the one hand cellulose ester, on the other hand paraffins or other substances of the same kind.

The object of the present invention consists in the preparation of compounds for waterproofing papers, fabrics, regenerated cellulose and the like, avoiding to a great extent these drawbacks by using as a support, instead of a cellulose ester or ether, a synthetic product having the chemical composition of a polymerized vinyl acetal. These products can be:

Polyvinyl formals or acetals such as those obtained by reacting aldehydes with more or less saponified vinyl esters.

Mixed products such as those obtained by condensing polymerized vinyl esters with two aldehydes, particularly formaldehyde and acetic paraldehyde.

It is, of course, understood that the use of products having the chemical constitution indicated remains within the scope of the invention by whatever process they are prepared. Such products have the general formula:

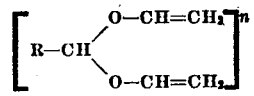

in which R is an aliphatic radical which can be H or CH³ according to whether the product is prepared by means of formaldehyde or acetaldehyde; $n$ is the degree of polymerization of the condensation product; it can vary within wide limits.

A suitable coating for the purpose proposed will therefore comprise:

1. One or a plurality of condensation products of polyvinyl alcohol with formaldehyde, acetaldehyde or a mixture of the two. Said products serve as a support.

2. One or a plurality of known waterproofing products such as paraffins, natural or synthetic waxes, chlorinated naphthalenes and the like.

3. One or a plurality of plastifiers for the condensation product, preferably insoluble in water. Compounds which are suitable for the intended object are: alkyltoluolsulfonamides, triphenylphosphate, butyl and cyclohexyl stearates, and the like. This list is in no way limitative, its object is merely to indicate nominally some of the products which can be used.

4. A suitable solvent mixture which comprises, in principle, one or a plurality of solvents of the vinyl condensation product, one or a plurality of solvents of the water-proofing product and of the plastifying product. Amongst the solvents which can be used there may be mentioned: methylene chloride, chloroform, methanol, ethanol, benzine, toluene, ethyl and methyl acetates, and the like. It is not possible to enumerate all the well known solvents which can be used, these being very varied owing to the fact in particular that the condensation products of polyvinyl alcohol and of aldehyde allow of very varied solvents according to their constitution.

If necessary, the compound can also contain natural or artificial oils or resins, adapted to give it particular properties.

The following examples fix the conditions of application of the invention, without limiting it in any way:

*Example 1.*—As a starting material, the condensation product of vinyl acetate and acetic paraldehyde, obtained by adding to 5 kilos. of polyvinylacetate, 2 litres of water, 1 litre of alcohol and 5 litres of strong hydrochloric acid, stirring and cooling and, after a few minutes, adding 5 kgs. of acetic paraldehyde, then standing 10 hours, at room temperature.

The following mixture is prepared:

| | |
|---|---|
| Above described condensation product | 800 |
| parts by weight. | |
| Hard paraffin | 50 |
| Solvent | 8000 |
| Ethylparatoluenesulfamide | 150 |

The solvent will be constituted in this case as follows:

| | Volumes |
|---|---|
| Toluene | 8 |
| Ethyl acetate | 2 |

This compound can be applied by any means to paper, regenerated cellulose, fabrics, which it is desired to render substantially impervious to water.

It is advantageous to heat said compound before use to a suitable temperature so that it shall be completely homogeneous.

*Example 2.*—As a starting material, a condensation product prepared from a polymerized polyvinylic acetate such that at 20°, a 10% solution of this compound in ethyl acetate flows in 300 seconds through a hole, through which the same volume of water at the same temperature flows in 15 seconds, by adding to 20 kilos. of this polyvinylic acetate, 9.6 kilos. of formaldehyde at 40% by volume, 2.55 kgs. of acetic paraldehyde, 4 kgs. of denatured alcohol and 40 kilos. of hydrochloric acid at 22° Baumé, stirring until solution is completed, allowing to remain in contact for 20 hours at room temperature preferably by stirring.

The following mixture is prepared:

| | |
|---|---|
| Above described condensation product | 600 |
| parts by weight. | |
| Triphenylphosphate | 100 |
| Ethylparatoluenesulfamide | 100 |
| Hard paraffin | 30 |
| Methanol | 600 |
| Benzine | 2160 |

This compound is particularly applicable to the treatment of fabrics. For this use and according to the waterproofing desired, it can, of course, be diluted with the mixture of methanol and of benzine in the proportions indicated. The application of the solution, preferably hot, will be effected by means of a padding machine. After drying, it is often advantageous to calender in order to give the waterproofed fabric a more agreeable aspect.

*Example 3.*—As a starting material a condensation product prepared as in Example 1, by substituting 3 kilos. of trioxymethylene for the 5 kgs. of acetic paraldehyde.

The following mixture is prepared:

| | |
|---|---|
| Above described condensation product | 100 |
| parts by weight. | |
| Butyl stearate | 9 |
| Polychloronaphthalene wax | 5 |
| Methylene chloride | 700 |
| Benzine | 200 |
| Methanol | 100 |

This compound should be applied hot to avoid any precipitation of the wax.

I claim:

1. A resinous liquid coating composition for waterproofing paper, fabrics and regenerated cellulose comprising a resin selected from the group consisting of water insoluble condensation products of polyvinyl alcohol and acetic paraldehyde, polyvinyl alcohol and a mixture of formaldehyde and acetic paraldehyde, and polyvinyl alcohol and trioxymethylene; a minor proportion of a waterproofing agent selected from the group consisting of paraffin, natural waxes, synthetic waxes, and chlorinated naphthalenes, said waterproofing agent being present in the proportion of 1 part waterproofing agent to 16 to 20 parts of said resin, said amount being sufficient to increase the water resistance of the coating; and a volatile organic solvent for both the said waterproofing agent and the said resin in amount sufficient to dissolve the same.

2. A resinous liquid coating composition for waterproofing paper, fabrics and regenerated cellulose comprising paraffin 50 parts by weight, 800 parts by weight of the water-insoluble product made by hydrolysis of 5 kilos. of polyvinyl acetate and subsequent condensation with 5 kilos. of acetic paraldehyde, 150 parts by weight of ethylparatoluenesulfamide, and 8000 parts by weight of a mixture of toluene and ethyl acetate.

3. A resinous liquid coating composition for waterproofing paper, fabrics and regenerated cellulose comprising paraffin 30 parts by weight, 600 parts by weight of the water-insoluble product of simultaneous hydrolysis and condensation of 20 kilos. of polyvinyl acetate with 9.6 kilos. of 40% formaldehyde and 2.55 kilos. of acetic paraldehyde, 100 parts by weight of triphenylphosphate, 100 parts by weight of ethylparatoluenesulfamide, 600 parts by weight of methanol, and 2160 parts by weight of benzine.

4. A resinous liquid coating composition for waterproofing paper, fabrics and regenerated cellulose comprising 9 parts by weight of butyl stearate, 5 parts by weight of polychlornaphthalene wax, 100 parts by weight of the water-insoluble product of hydrolysis of 5 kilos. of polyvinyl acetate and subsequent condensation with 3 kilos. of trioxymethylene, 700 parts by weight of methylene chloride, 200 parts by weight of benzine, and 100 parts by weight of methanol.

MAURICE HENRI BELLOC.